United States Patent [19]

Gerber

[11] Patent Number: 4,653,373
[45] Date of Patent: Mar. 31, 1987

[54] KNIFE BLADE AND METHOD FOR MAKING SAME

[75] Inventor: Heinz J. Gerber, West Hartford, Conn.

[73] Assignee: Gerber Scientific Inc., South Windsor, Conn.

[21] Appl. No.: 817,018

[22] Filed: Jan. 8, 1986

[51] Int. Cl.⁴ .............................................. D06H 7/00
[52] U.S. Cl. ........................................ 83/697; 30/350; 76/101 R; 83/174; 83/701; 83/925 CC
[58] Field of Search .................. 83/697, 925 CC, 174, 83/174.1, 701; 29/DIG. 12; 30/350, 357; 76/101 R, 101 A, 104 R, 104 A, DIG. 4, DIG. 6

[56] References Cited

U.S. PATENT DOCUMENTS

| | | | |
|---|---|---|---|
| 1,414,997 | 5/1922 | Zinn . | |
| 2,760,266 | 8/1956 | Sanders | 76/104 R X |
| 3,193,926 | 7/1965 | Honiss | 30/350 |
| 3,752,027 | 8/1973 | Gerber et al. | 83/925 CC X |
| 3,772,955 | 11/1973 | Pearl | 83/925 CC X |
| 3,841,189 | 10/1974 | Spengler et al. | 83/925 CC X |
| 3,874,900 | 4/1975 | Post et al. | 30/350 X |
| 4,132,138 | 1/1979 | Miyamoto | 83/697 |
| 4,133,236 | 1/1979 | Pearl | 83/925 CC X |
| 4,495,698 | 1/1985 | Gerber, Jr. | 30/357 |

FOREIGN PATENT DOCUMENTS

| | | | |
|---|---|---|---|
| 520431 | 3/1931 | Fed. Rep. of Germany | 30/350 |
| 120937 | 9/1980 | Japan | 30/350 |
| 65086 | 7/1941 | Norway | 30/350 |

Primary Examiner—Frank T. Yost
Attorney, Agent, or Firm—McCormick, Paulding and Huber

[57] ABSTRACT

A knife blade for cutting sheet material has a cutting portion which includes two adjoining faces defining a cutting edge and comprises a relatively soft or high wear base material and a relatively hard or low wear coating. One of the faces is formed by the relatively hard coating and the other face is formed by the relatively soft base material. Both of the faces of the cutting portion are bevelled and are exposed to the sheet material during cutting. Another knife blade embodying the invention has a cutting portion which includes one face formed of a relatively soft base material and another corrugated face formed of a relatively hard coating.

11 Claims, 13 Drawing Figures

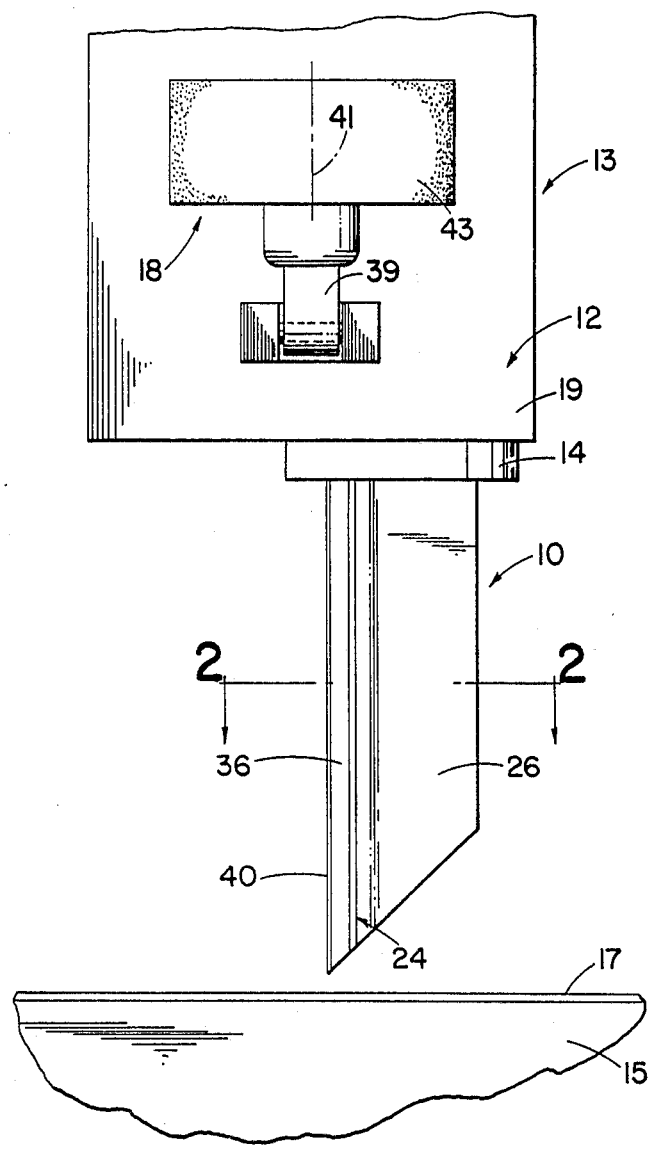
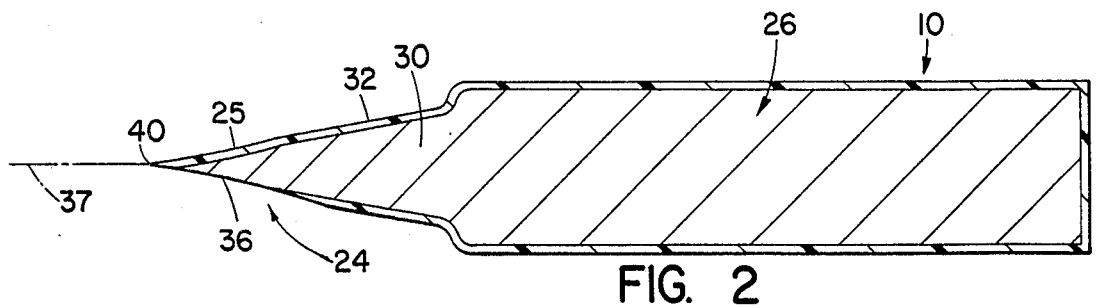

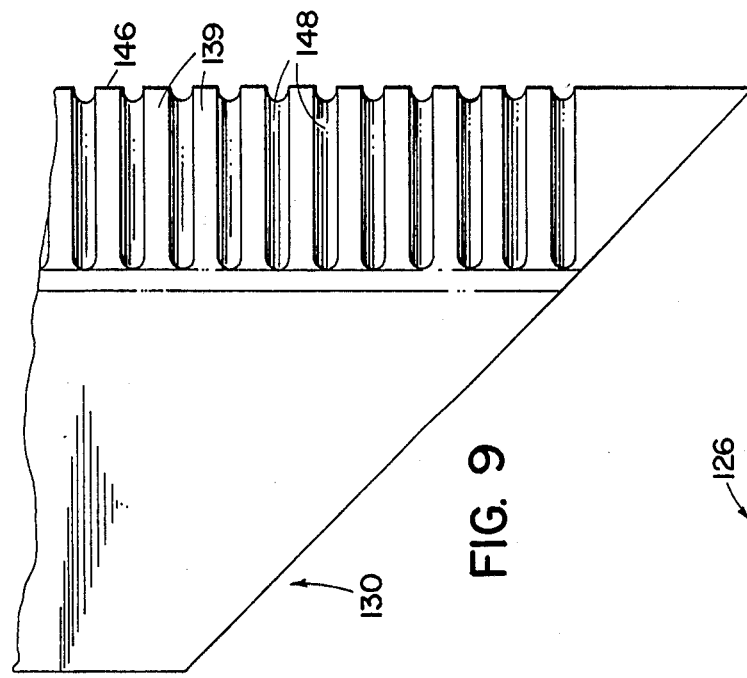
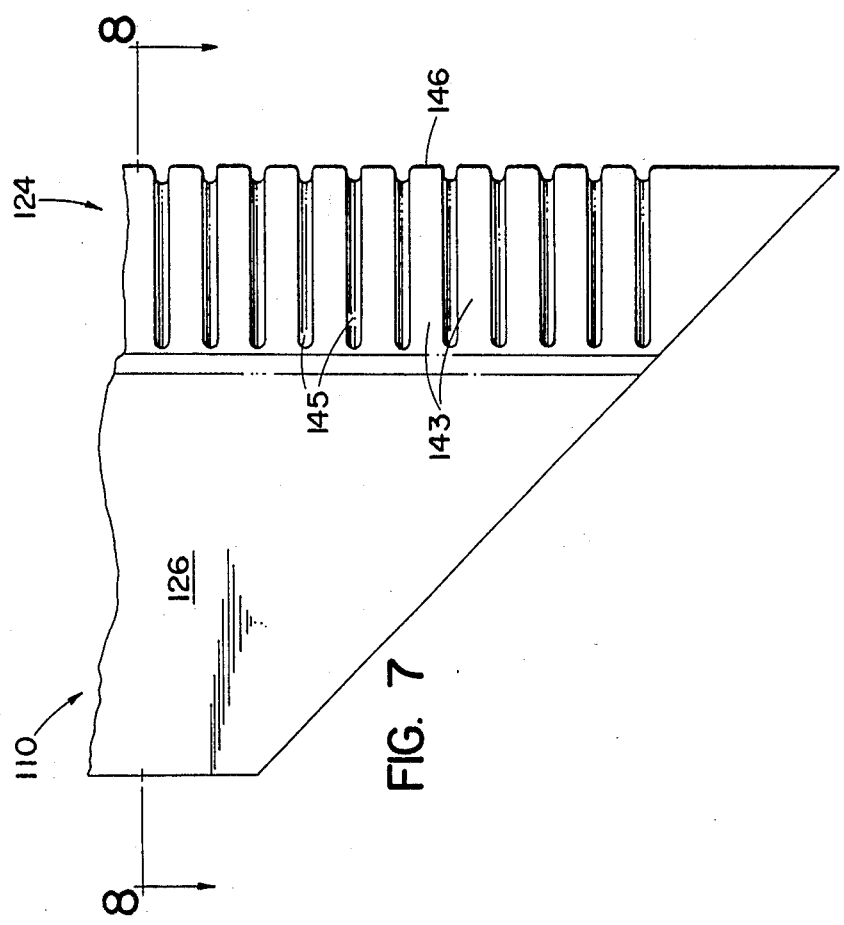
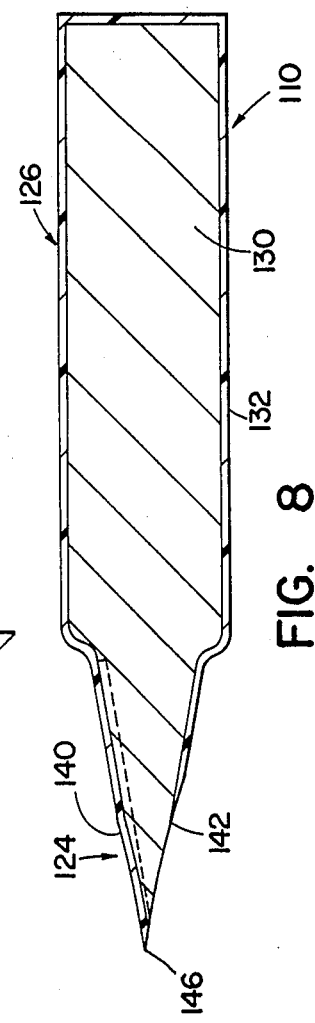
FIG. 7
FIG. 8
FIG. 9

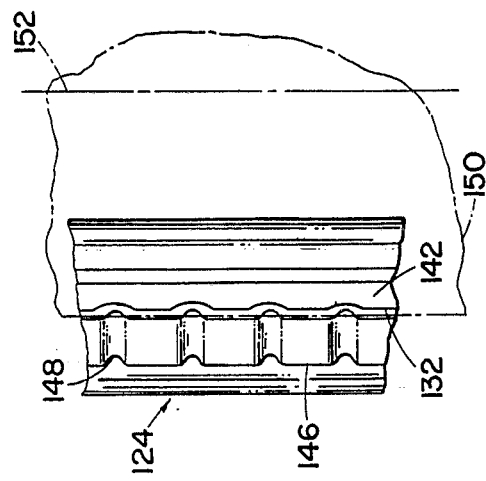
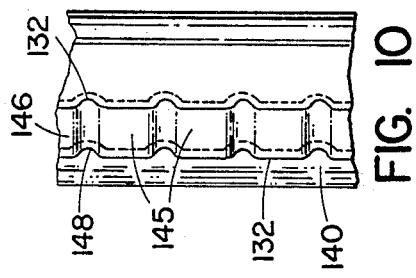
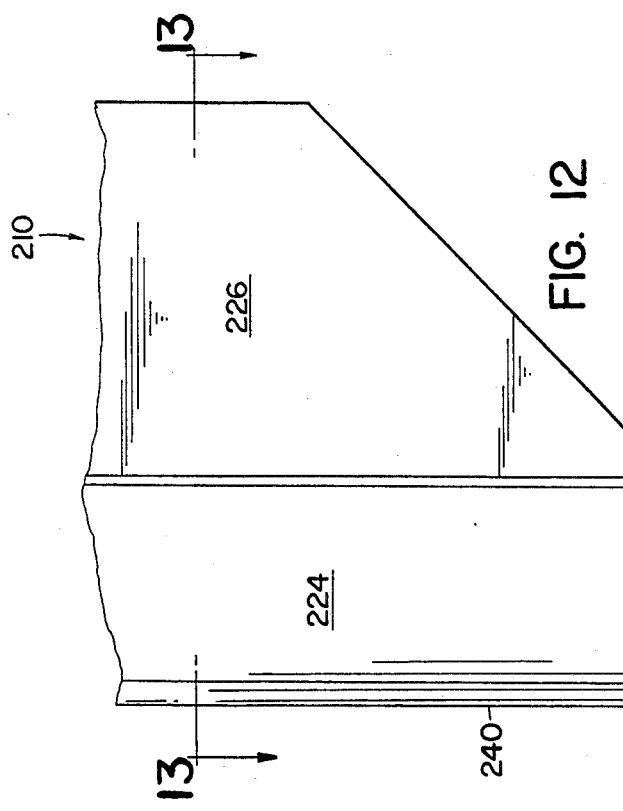
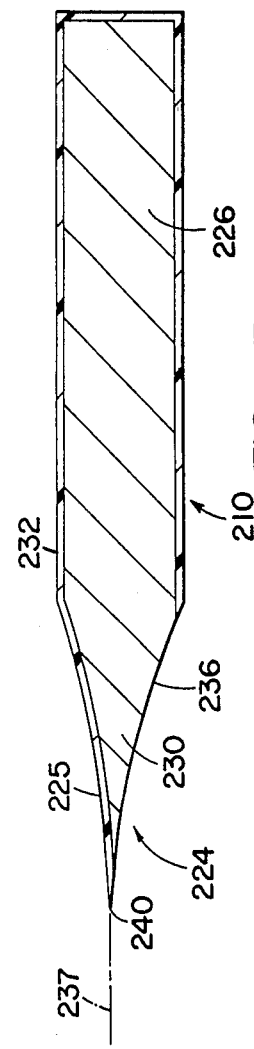

KNIFE BLADE AND METHOD FOR MAKING SAME

BACKGROUND OF THE INVENTION

The invention relates generally to knife blades and deals more particularly with the construction of and the method for making knife blades for cutting sheet material which blades exhibit some self sharpening characteristics.

A blade of the general type with which this invention is concerned is shown in U.S. Pat. No. 3,681,846 to Gerber. The '846 blade has three layers, a relatively hard layer sandwiched between two relatively soft layers. In one embodiment of the '846 blade, the inner layer is made of tungsten carbide and the two outer layers are made of steel or aluminum. An outer face of each outer layer is bevelled, and ideally, the two bevelled faces converge upon an exposed edge of the inner, relatively hard layer such that the exposed edge of the inner layer protrudes slightly from the outer layers forming a cutting edge or peak to the knife blade. The outer layers support the inner layer. In this embodiment, the thickness of the relatively hard inner layer varies in the longitudinal direction of the cutting edge so that the cutting edge wears unevenly forming a serration. Eventually, the cutting edge dulls and may be sharpened by one or two grinding wheels which bear against both of the outer, relatively soft layers of the blade.

It has proven difficult to accurately grind the two outer faces of the relatively soft layers such that the peak of the blade is formed exclusively by the exposed edge of the inner layer. The reason is that it is difficult to align the grinding wheel such that its axis is precisely parallel to the plane defined by the inner layer and misalignments of only a few thousandths of an inch result in the peak of the blade being partially formed by the outer, relatively soft layers, in which cases, the blade dulls easily.

Accordingly, a general object of the invention is to provide a knife blade for cutting sheet material which blade does not dull easily.

A more specific object of the invention is to provide a blade of the foregoing type which does not require precise sharpening.

Another specific object of the invention is to provide a knife blade of the foregoing type which exhibits some self-sharpening properties.

Another general object of the invention is to provide methods for making the cutting blades of the foregoing type.

Other objects of the present invention will become apparent from the following detailed description.

SUMMARY OF THE INVENTION

The invention resides in a knife blade used for cutting sheet material. The blade may be installed in an automatic cutting apparatus which reciprocates the blade during cutting. The knife blade comprises a cutting portion having a base and a coating on a portion of the base, the base being formed from a relatively high wear material and the coating being formed from a relatively low wear material.

According to one feature of the invention, the relatively low wear material may be harder than the high wear material. The cutting portion has two adjoining faces; one of the faces is formed by the relatively low wear, hard coating material and the other face is formed by the relatively high wear soft base material. With this design, the relatively low wear, hard coating on the cutting portion is always exposed to the workpiece to provide effective cutting. Also, the relatively high wear, soft face tends to wear more rapidly than the relatively low wear, hard face exposing the relatively low wear, hard face further and providing a degree of self-sharpening.

According to another feature of the invention, either face of the cutting portion may be provided with an alternating sequence of hills and valleys, the valleys intersecting a cutting edge to provide serrations which facilitate the cutting.

BRIEF DESCRIPTION OF THE FIGURES

FIG. 1 is a fragmentary side view of a cutting apparatus including a knife blade which embodies the invention.

FIG. 2 is a sectional view of the blade of FIG. 1 taken along the line 2—2.

FIG. 7 is a fragmentary plan view of another cutting blade which embodies the invention.

FIG. 8 is a sectional view of the knife blade of FIG. 7 taken along the line 8—8.

FIGS. 9–11 illustrate a method for producing the knife blade of FIG. 7.

FIG. 12 is a fragmentary side view of another knife blade which embodies the invention.

FIG. 13 is a sectional view of the blade of FIG. 12 taken along the line 13—13.

DETAILED DESCRIPTION OF THE PREFERRED EMBODIMENTS

Figure 5:
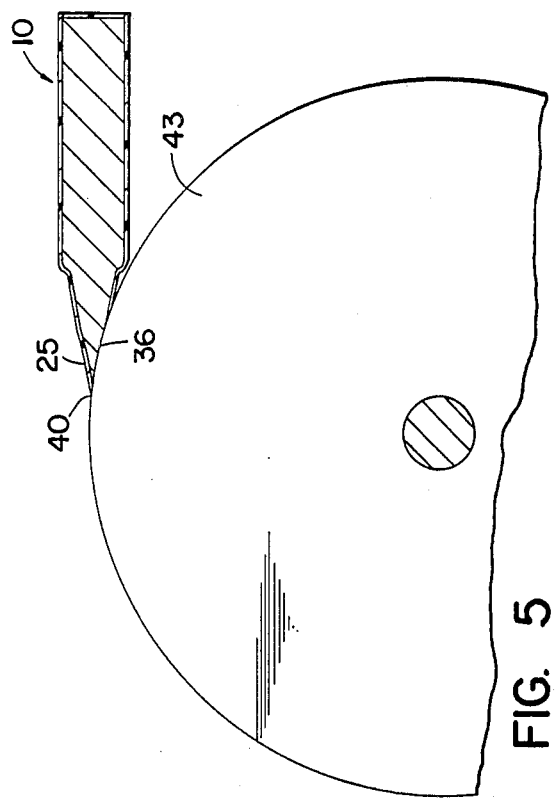
FIGS. 3–5 illustrate steps in a method for producing the blade of FIG. 1.

Turning now to the drawings, FIG. 1 illustrates a knife blade generally designated 10 which embodies the present invention. The blade 10 is received in a cutting head 12 of an automatic cutting apparatus 13. The apparatus 13 includes a penetrable worksheet supporting bed 15, a means for reciprocating the blade 10 in a direction perpendicular to the bed 15 and a means for moving the blade in an X-Y plane parallel to the bed 15. Sheets 17,17 of fabric are supported on the bed 15 for cutting. The cutting head 12 includes a blade holder 14, a housing 19 having a guide slot through which the blade 10 and blade holder 14 reciprocate, and a movable grinding assembly 18 for sharpening the blade 10. For a further description of a cutting apparatus which may be used to reciprocate a knife blade and move it in an X-Y plane parallel to a support surface, reference may be made to U.S. Pat. No. 3,805,650 to Pearl issued Apr. 23, 1974 assigned to Gerber Garber Technology and hereby adopted by reference as part of the present disclosure.

As shown more clearly in FIG. 2, the blade 10 comprises a cutting portion 24 and a strenthening portion 26 integrally connected to one another. By way of example, the blade is 3/16 inches front to back (left to right in FIG. 2), and is 0.028 inches thick at its thickest portion.

In the illustrated embodiment, the cutting portion 24 includes two bevelled cutting faces 25 and 36 which converge upon one another to yield a cutting edge 40. Both of the faces 25 and 36 may have a slight cylindrical concavity due to hollow grinding of the base material. The hollow ground increases the sharpness of the cutting portion 24. Both of the faces 25 and 36 form approximately the same angle relative to a plane 37. The plane 37 bisects the blade 10 and so, defines a natural cutting direction or plane for the blade 10 so that the cutting portion has a generally symmetrical cross-section and provides a minimal resistance to cutting.

The blade 10 is formed from an inner base or support body 30 of relatively high wear material and an outer relatively wear resistant coating 32. In the illustrated embodiment, the outer coating 32 surrounds all of the base 30 in its final form except for the face 36 of the cutting portion 24. To provide a coating which is more wear resistant than the base 30, the coating 32 is formed of a harder material than the base 30. By way of example, the base 30 is made of hardened tool steel having a hardness of 60 Rockwell C or softer and the outer coating 32 is made of titanium nitride having a hardness of 80-90 Rockwell C. The thickness of the outer coating may be in the range 0.1/1,000 inches to 1/1,000 inches with a suggested thickness of 0.5/1,000 inches which thickness is substantially uniform throughout the coating. When the blade 10 is sharp, the cutting edge 40 is defined primarily by the exposed edge of the coating 32. A thin coat is desirable to yield a sharp cutting edge but the coat should not be so thin as to rapidly break during cutting. The titanium nitride also provides the blade in general with a low coefficient of friction to make it easier for the blade to slice through the sheet material.

Because the material of the outer coating 32 is more wear resistant than the material of the base 30, as the blade 10 reciprocates and cuts sheet material or other workpieces, the noncoated face 36 of the cutting portion 24 wears more rapidly than the coated face 25 of the cutting portion 24. Consequently, during usage, the cutting edge 40 of the cutting portion 24 may remain defined, to a large extent, by the exposed edge of the coating 32 on the face 25. This is desirable because the relatively hard edge of the coating 32 is generally better than the softer base material for cutting. Also, the coating 32 is made thinner and therefore sharper than the base of the cutting portion 24.

While the material of the base 30 of the cutting portion 24 wears in a very gradual manner by the removal of fine particles of the base material, the exposed edge of the coating 32 on the cutting portion may tend more to wear by chipping due to brittle fracture as the base material recedes and the adjacent coating loses its support. The brittle fracture property of the coating 32 may be advantageous for cutting certain types of sheet material because it makes the cutting edge 40 jagged or serrated which in many instances provides more effective cutting than a smooth cutting edge of the same sharpness. Applicant believes that the cutting portion of the blade 10 will remain sharp enough to cut 1,000 to 10,000 linear inches of fabric on the fold, enough to cut one to ten men's suits.

If the coating 32 on the cutting portion 24 recedes more rapidly than the adjacent base material, the face 36 may be ground by the grinding wheel assembly 18 to again expose the coating 32 at the cutting edge. The grinding assembly 18 comprises an arm 39 which is pivotally mounted to the housing 19 and a grinding wheel 43 which is carried by the arm 39. The arm 39 may be pivoted downwardly so that the grinding wheel engages the face 36 with an axis 41 of the wheel parallel to the cutting edge 40.

The strengthening portion 26 gives the blade lateral stiffness so that as the blade 10 moves in a nonlinear path in the X-Y plane and the worksheets 17,17 and penetrable bed 15 exert lateral forces on the cutting portion 24, the cutting portion 24 is able to resist deflection. Also, the strengthening portion provides a grip for the blade holder 14.

Figure 3:
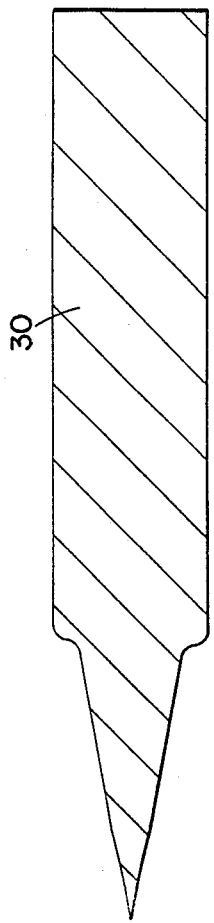
Figure 4:
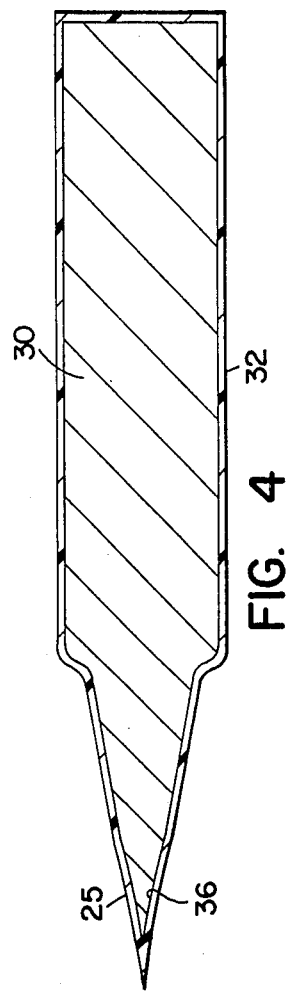

FIGS. 3-5 illustrate a method for producing the blade 10. Initially, as shown in FIG. 3, the base 30 is provided of hardened steel, which base may be formed by a machining process. Then as shown in FIG. 4, the base 30 is coated with the titanium nitride. In the illustrated embodiment, the coat covers virtually the entire surface of the base 30 including both faces 36 and 25 of the cutting portion 24.

The coating 32 may be formed by one of various commercially available processes, such as a "Titan Kote" TM chemical depositing process provided by Richter Precision Incorporated, or a chemical depositing process provided by Blazers Tool Coating, Inc. of North Tonawanda, New York. In their chemical depositing processes, suitable compounds are mixed to form titanium nitride gases which are then chemically bonded to or deposited on the surface of the base 30. An ion bonding process may also be used to form the coating 32.

Next, as shown in FIG. 5, the face 36 of the cutting portion 24 is ground by the grinding wheel 43 or another grinding wheel to remove the associated portion of the coat 32, to sharpen the cutting portion 24, and to expose an edge of the coat 32 to form the cutting edge 40. Herein lies a virtue of the design of the blade 10. Because the face 25 is coated with the relatively hard material and is exposed to the sheet material during cutting, even if the grinding wheel is somewhat misaligned so that its axis is not aligned precisely parallel to the plane 37 and the cutting edge is not defined entirely by the exposed edge of the coating 32 but is partially defined by the base material 30, the blade 10 will still be effective in cutting because one side of the cutting portion will still be defined by the very hard coating material. Moreover, as the cutting portion wears, the relatively soft base material located at the cutting edge will tend to wear faster than the adjacent, relatively hard coating causing the cutting edge 40 to be defined more and more by the coating material and less and less by the relatively soft base material.

The grinding wheel 43 may have a surface covered by either fine or coarse grit. If the fine grit is utilized, then the blade 10 may be reciprocated during the grinding process to ensure uniform grinding and to provide the face 36 with a smooth surface. If the coarse grit is utilized, it may score the face 36 and the exposed cutting edge 40 to make the cutting portion 24 ragged or serrated. If the coarse grit is utilized on the grinding wheel 43, then the blade 10 may not be reciprocated in some cases or may be reciprocated slowly in other cases while the grinding wheel engages the cutting portion 36 so that the scores produced by the grit intersect the cutting edge 40.

Figure 6:
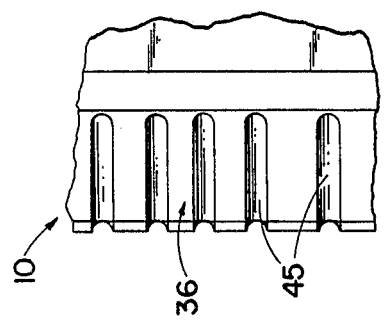
FIG. 6 is an enlarged, fragmentary side view of a modified form of the knife blade of FIG. 1.

FIG. 6 illustrates the blade 10 after it has been scored by the coarse grit and worn to a small degree by usage. Scores 45,45 in the base material of the face 36 cause the cutting portion to have an uneven thickness along its length so that the cutting portion wears unevenly on both faces, and so, yields a more jagged or serrated cutting edge from usage than would normally occur through brittle fracture of the coating 32. The scores 45,45 are perpendicular to the cutting edge because the blade 10 is maintained stationary during the grinding process.

It is also possible to form the cutting portion 24 by starting with the machined base 30 of FIG. 3, masking the face 36, coating the unmasked surface of the base with the titanium nitride and then removing the mask. This avoids the subsequent grinding step.

FIGS. 7, 8, and 12 illustrate another knife blade generally designated 110 which embodies the present invention and which may be installed in the cutting head 12. The blade 110 is formed from an inner body or base 130 and an outer coating 132, which base and coating may be made of the same materials as the base 30 and coating 32 of the blade 10, for example, hardened steel and titanium nitride, respectively. The coating 132 may also be applied by one of the chemical depositing processes described above. The thickness of the coating 132 is also similar to that of the coating 32, 0.1/1,000 inch to 1/1,000 inch with a suggested thickness of 0.05/1,000 inch as a trade-off between sharpness and strength. The blade 110 comprises a cutting portion 124 and an integrally connected, strengthening portion 126.

The cutting portion 124 has two hollow ground faces 140 and 142, which faces intersect or converge upon one-another to form a cutting edge 146 and are angled or bevelled relative to a plane 147 which bisects the blade 110 and defines a natural cutting plane or direction for the blade 110. The face 140 is coated with the relatively hard material and has ridges or corrugations formed by an alternating sequence of hills 143,143 and valleys 145,145. The cutting edge 146 is primarily defined by the coat 132 on the face 140 and is jagged or serrated due to the hills 143,143 and valleys 145,145.

The strengthening portion 126 helps the cutting portion 124 to resist lateral deflection, provides a grip for the blade holder 14, and is identical in design to the strengthening portion 26 of the blade 10.

FIGS. 9-11 illustrate a method for making the blade 110. Initially, the body or base 130 shown in FIG. 9 is provided, for example, by an appropriate machining process. Grooves 148,148 are cut in a face 139 of the base 130 which grooves are perpendicular to a cutting edge 146 of the blade 110. By way of example, the grooves 148,148 are 1/1,000 inch to 5/1,000 inch deep. The grooves 148,148 are shown to be evenly spaced although this is not necessary.

Next, as shown by the front view of FIG. 10, the base 130 is coated, and in the illustrated embodiment, the coating covers virtually the entire surface of the base 130. The coating has a substantially uniform thickness and therefore takes the shape of the cutting portion 124 including the corrugated shape of the face 140 forming the hills 143, 143 and the valleys 145,145.

Next, as shown in FIG. 11, the face 142 of the cutting portion 124 is ground by a grinding wheel 150 having an axis 152 parallel to the cutting edge 146. The grinding wheel 150 removes the hard coat on the face 142, and cuts back the exposed portions of the valleys 148, 148 along the cutting edge 146. This adds jaggedness to the cutting edge 146 as shown in FIG. 9, the exposed edges of the hills 143, 143 forming protruding teeth of the cutting edge 146 and the exposed edges of the valleys 145, 145 forming recesses between the teeth 143, 143. The recesses are somewhat deepened by the grinding process. The cutting edge 146 has a saw tooth form which is effective in cutting. Moreover the cutting ability is not directly dependant on the sharpness of the cutting portion 124 so that the cutting portion 124 is able to cut effectively even after the cutting edge 146 wears and dulls somewhat. Note also that because the face 142 is formed by the relatively soft and high wear material, the face 142 wears more rapidly than the coating on the face 140 and therefore recedes from the cutting edge 146 and the coat or the face 140 to aid in maintaining the sharpness of the cutting portion 124.

After a significant amount of cutting, the cutting portion 124 may become dull, and a grinding process may be utilized to sharpen it. The grinding wheel 150 or the grinding wheel 43 may be used to sharpen the cutting portion 124. Because the face 140 is coated and exposed to the sheet material during cutting, even if the grinding wheel is somewhat misaligned so that its axis is not precisely parallel to the plane 147 and the cutting edge is not defined entirely by the exposed edge of the coating 132 on the cutting portion 124, the blade 110 will still be effective in cutting because one side of the cutting portion will still be defined by the very hard, coating material.

FIGS. 12 and 13 illustrate another knife blade generally designated 210 which embodies the present invention. The knife blade 210 may be received within the cutting apparatus 13 and comprises a cutting portion 224 and a strengthening portion 226 integrally connected to one-another. The cutting portion 224 includes two bevelled cutting faces 225 and 236. Both of the faces 235 and 236 may have a slight cylindrical concavity due to hollow grinding of the base material of the cutting portion 224. Both of the faces 225 and 236 form approximately the same angle relative to a plane 237. The plane 237 bisects the blade 210 and defines a natural cutting plane for the blade 210 so that the cutting portion has a generally symetrical cross-section and provides a minimal resistance to cutting.

The blade 210 is formed from an inner base or inner support body 230 and an outer, wear resistant coating 232. In the illustrated embodiment, the outer coating 232 surrounds all of the base 230 in its final form except for the face 236 of the cutting portion 224. The coating 232 is formed of a harder more wear resistant material than the base 230. By way of example, the base 230 is made of hardened tool steel having a hardness of 60 Rockwell C or softer and the outer coating 232 is made of titanium nitride having a hardness of 80-90 Rockwell C. The thickness of the outer coating may be in the range 0.1/1,000 inches to 1/1,000 inches with a suggested thickness of 0.5/1,000 inches which thickness is substantially uniform throughout the coating. When the blade 210 is sharp, a cutting edge 240 is defined primarily by the exposed edge of the coating 232. A thin coat is desirable to yield a sharp cutting edge but the coat should not be so thin as to rapidly break during cutting. Except for the cross-section shape of the blade 210, the blade 210 is very similar to the blade 10, both in design and performance, and is produced in a similar manner. The blade 210, like the blade 10, may be provided with grooves which intersect the cutting edge 240.

By the foregoing, knife blades embodying the present invention have been disclosed. However, numerous modifications and substitutions may be made without deviating from the scope of the invention. For example, if desired, the width of the strengthening portions 26 and 126 of the knife blades 10 and 110 respectively may be decreased and bevelled to aid the blades in slicing through the sheet material. Also, if desired, either face of the cutting portion 24 or 124 may be made parallel to the cutting planes 37 and 147, respectively and the other face made bevelled to intersect the other face of the cutting portion. Also, if desired, either or both faces of the cutting portions 24,124 or 224 may be made flat without the cylindrical concavity of the aforesaid hollow ground. Therefore, the invention has been disclosed by way of illustration and not by limitation.

I claim:

1. An elongated knife blade having a longitudinal axis and a cutting edge extending parallel to said longitudinal axis and which knife blade is intended to be reciprocated along said longitudinal axis to cut sheet material through which it passes, said knife blade comprising:
    an elongated base having a longitudinal axis, said base also having a rear strength portion with an outer surface and a cross-sectional shape symmetrical with respect to a middle plane parallel to said longitudinal axis, and said base also having a front cutting portion with two faces both of which are at an angle to said middle plane and which converge forwardly from said strength portion to a base edge parallel to said longitudinal axis, and
    a thin coating extending over substantially all of said outer surface of said base except for at least a part of one of said faces located adjacent said base edge so that the material of said base is exposed on said one face adjacent said base edge, said coating on the other of said two faces extending forwardly from said base edge to form a cutting edge parallel to said longitudinal axis, said base material being less wear resistant than the material of said coating.

2. A method for producing a knife blade, said method comprising the steps of:
    forming a base of a relatively high wear material which base defines a cutting portion, said cutting portion comprising first and second intersecting faces,
    applying a relatively low wear coating material to both faces of said cutting portion of said base, and
    grinding away the coating material from said first face of said cutting portion while leaving the coating material on said second face of said cutting portion to yield a cutting edge.

3. A method as set forth in claim 2 wherein the step of forming the base of a relatively high wear material is performed by forming the base of a relatively soft material and
    the step of applying a coating of a relatively low wear material is performed by applying a coating of a relatively hard material.

4. A method as set forth in claim 3 wherein the step of forming the base comprises the step of forming said second face of said cutting portion at an angle relative to a plane which defines a natural cutting direction of said blade.

5. A method as set forth in claim 3 wherein the step of applying a coating material comprises the step of depositing titanium nitride on said base.

6. A method as set forth in claim 5 wherein the step of forming a base comprises the step of machining the base from hardened steel.

7. A method as set forth in claim 3 further comprising the step of producing grooves in said first face of said cutting portion of said base, which grooves intersect said cutting edge.

8. A method as set forth in claim 7 wherein the step of producing grooves in said cutting portion of said base is performed simultaneous with the step of grinding away the coating aterial from said first face.

9. A method for producing a knife blade, said method comprising the steps of:
    forming a base for a cutting portion, said base having first and second bevelled faces which intersect to form an edge,
    producing grooves in said first face of said base of said cutting portion, said grooves intersecting said edge,
    uniformly coating said first face with a material which is harder than the material of said base, and
    grinding said second face of said cutting portion in the vicinity of said edge to remove portions of said coating which coat said grooves.

10. A method as set forth in claim 9 further comprising the step of coating said second face with the same material which coats said first face, said coating of said second face being performed before the step of grinding said second face.

11. A method as set forth in claim 9 wherein said first face is coated with titanium nitride.

* * * * *